Patented June 30, 1931

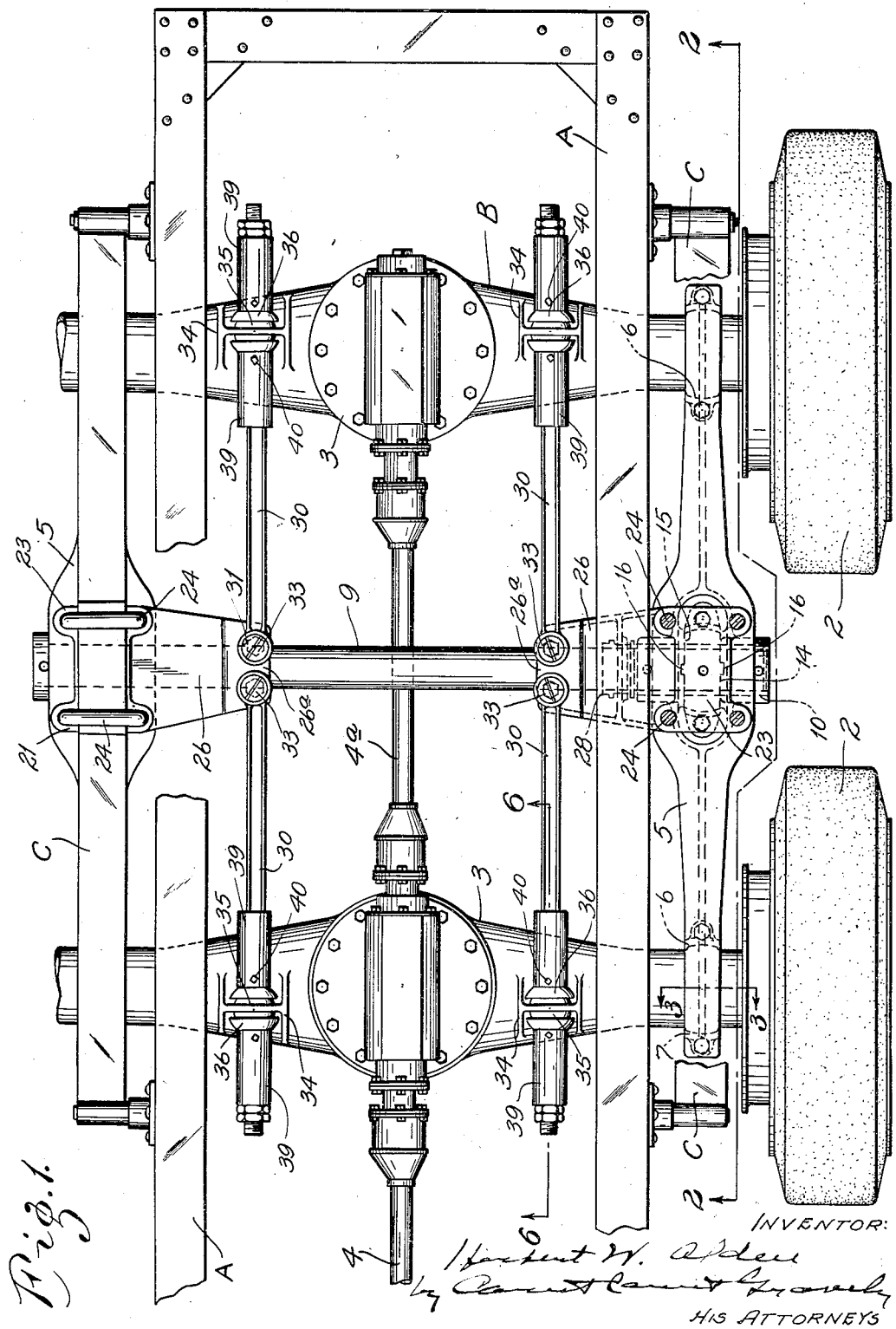

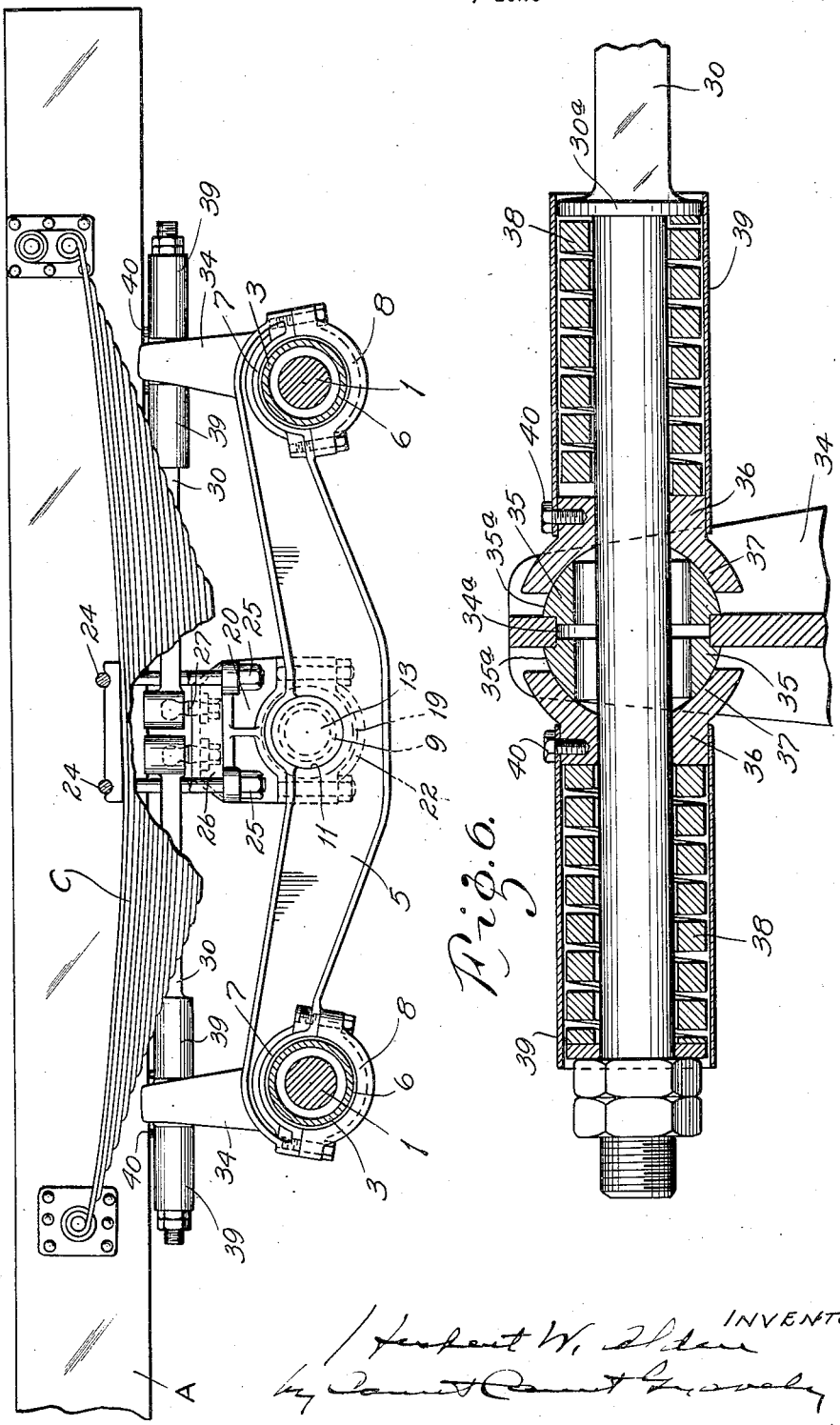

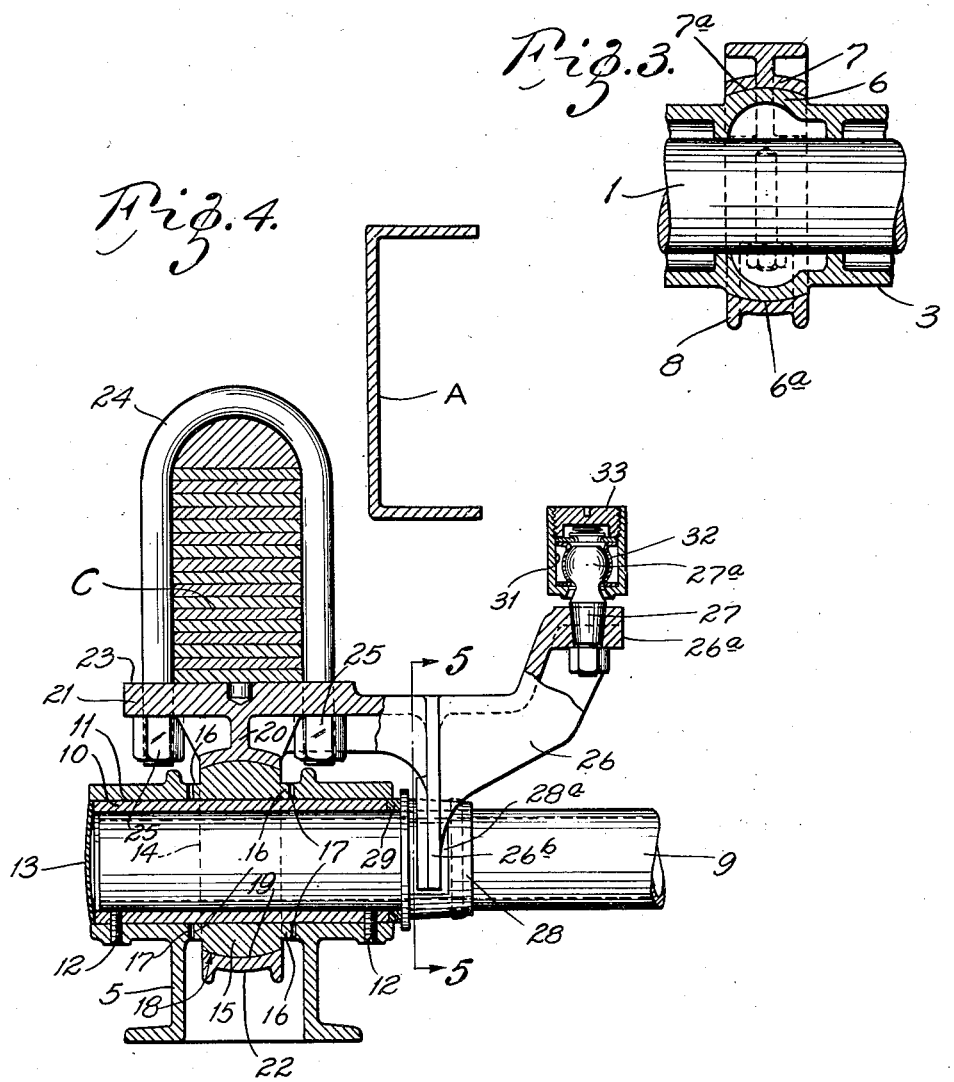
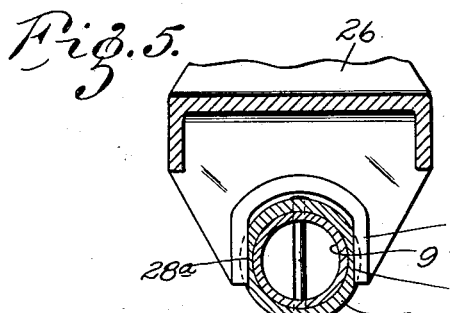

1,811,837

UNITED STATES PATENT OFFICE

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO

MOTOR VEHICLE

Application filed June 28, 1928. Serial No. 288,931.

This invention relates to motor vehicles of the kind having two rear driving axles enclosed in axle housings that are connected together by side frame members to form a truck. The invention has for its principal objects to maintain the two axles of the truck in parallel alinement and in proper spaced relation, to permit vertical movement of one end of an axle housing independently of the other end of said housing and the other axle housing, to provide means for resisting the driving and braking torque exerted on the axle housings by transmitting such torque stresses to the body supporting springs, to prevent twisting or bowing of said springs under such torque stresses, and to prevent the truck frame from going out of square. The invention consists in the construction, combinations and arrangements of parts hereinafter described and claimed.

In the accompanying drawings, which form part of this specification and wherein like symbols refer to like parts wherever they occur;

Fig. 1 is a plan view of the rear portion of the chassis of a motor vehicle provided with a rear truck and a torque neutralizing mechanism embodying my invention;

Fig. 2 is a vertical longitudinal section on the line 2—2 in Fig. 1;

Fig. 3 is a vertical section showing the connection between the end of one of the axle housings and the cooperating side frame, the section being taken on the line 3—3 in Fig. 1;

Fig. 4 is a vertical section, showing the connection between one of the spring seats and the adjacent side frame member and cross tube;

Fig. 5 is a vertical cross-section through the spring seat and cross tube on the line 5—5 in Fig. 4; and Fig. 6 is a vertical longitudinal section through one of the torque rods, showing the ball-and-socket connection between said rod and the upstanding web on the axle housing.

The accompanying drawings illustrate the rear end portions of the longitudinal side bars or frame members A of a motor vehicle, a rear truck B and semi-elliptic body supporting leaf spring connections C between said side rails and said truck. As shown in the drawings, the body supporting springs are located outside the side rails of the vehicle frame and extend longitudinally thereof above the two driving axles with their forward ends pivoted to the side rails and with their rear ends shackled thereto. The truck is provided with two rear driving axles, each of which comprises axial alined driving shaft sections 1 carrying road wheels 2 at their outer ends and operatively connected at their inner ends to receive motion from a differential mechanism (not shown). The drive shaft sections and differential mechanism of each driving axle are encased within a separate axle housing 3, and the two driving axles are coupled together to receive motion from the propeller shaft 4 of the engine (not shown) by means of a suitable driving connection 4a extending between the two housings. The construction thus far described is well known and it is considered unnecessary to limit it in detail.

The two axle housings 3 of the truck are spaced apart longitudinally of the vehicle and are held parallel to each other by horizontal truck side bars or frames 5 which extend longitudinally of the side rails A of the vehicle from axle housing to axle housing. As shown in the drawings, each axle housing 3 is provided adjacent to each end with a circumferential rib 6 which is journaled in a bearing 7 provided therefor in the portion of the truck side frame located adjacent thereto. The circumferential ribs or journal portion 6 of the axle housings are provided with convex spherical peripheral surfaces 6a; and, likewise, the bearings therefor are also provided with concave spherical surfaces 7a, thereby forming universal joints of the ball-and-socket type between the axle housings and the side frames of the truck. As shown in the drawings, the bearings for the spherical journal portions of the axle housing are made in two parts to facilitate assembling, one-half of a bearing being formed integral with a side frame and the other half of said bearing formed by a cap member 8, which is bolted or otherwise detachably secured to said side frame.

The two side frame members 5 of the truck B are connected together midway between the two driving axles by means of a cross member preferably in the form of a cylindrical tube 9. Each end of the cross tube 9 of the truck is journaled in a cylindrical sleeve or bushing 10 mounted in a horizontal cross bore 11 provided therefor in the adjacent side frame of said truck, said sleeve being held against axial and rotary movement in said bore preferably by means of screws 12. The outer end of the horizontal cross bore 11 in each side frame member is closed by means of a cupped disk 13. Each side frame member of the truck is provided midway of the ends of the horizontal cross bore 11 with an opening 14 that extends through said frame member from top to bottom thereof and is made large enough to accommodate a journal member in the form of an annular collar or sleeve 15 which is mounted on the cross tube supporting sleeve within the opening 14. Each journal sleeve 15 is provided at its opposite ends with outstanding lugs 16 adapted to seat in recesses 17 provided therefor in the opposing faces of the adjacent surfaces of the opening in each side frame. The peripheral surface of the journal sleeve in each side frame of the truck is provided with a convex spherical surface 18 adapted to cooperate with the concave spherical surface 19 provided therefor in a split or two part bearing 20 which projects downwardly from a spring seat 21 located thereabove. As shown in the drawings, the upper part of the split bearing 20 is made integral with the spring seat 21 and the lower portion thereof is in the form of a cap 22 that is bolted or otherwise rigidly secured to the bearing portion of the spring seat.

As shown in the drawings, each spring seat 21 is provided at its top with a horizontally disposed flange or seat 23 adapted to support the middle portion of the body supporting leaf spring C located thereabove. The leaves of said spring are clamped together and to the top flange of the spring seat by means of inverted U-shaped bolts 24 that are placed astraddle the spring with their lower ends passing through openings provided therefor in the top flange and threaded to receive securing nuts 25 which bear against the underside of said flange. Each spring seat is provided on its inner side with a horizontally extending bracket portion 26 which projects inwardly beneath the adjacent side rail of the vehicle and terminates in an upwardly offset portion 26a having two vertically disposed bolts 27 secured thereon provided with spherical or ball-shaped upper end portions 27a. The inwardly extending bracket portion 26 of each spring seat is also provided with a depending yoke or fork 26b adapted to embrace or straddle a collar 28 that is pinned or otherwise rigidly secured to the cross tube 9 of the truck. As shown in the drawings, the collar 28 is provided with flat side faces 28a; and the branches of the depending fork or yoke portion 26b of the bracket portion 26 of the spring seat are adapted to bear flatwise against the flat sides of said collar, thereby preventing the spring clip from swinging in a horizontal plane on the spherical journal portion of the sleeve or bushing. As shown in the drawings, felt washers 29 are mounted on the cross tube 9 of the truck between the cross tube supporting sleeves or bushings 10 therefor and the flat sided collars to prevent leakage of oil from the inner ends of the cross tube and the side truck frame members.

The axle housings are also connected near their ends to the spring seats by means of torque bars or rods 30 that are disposed above said housings and extend longitudinally of the side rails from axle housing to spring seat just inside said side rails. As shown in the drawings, there are two torque rods adjacent to each side rail of the vehicle, one rod connecting one end of an axle housing with an adjacent spring seat and the other rod connecting the corresponding end of the other axle housing with said spring seat. Each of the torque rods is provided at one end with a recess 31 within which is located a split sleeve 32 provided with a spherical bearing or socket adapted to receive and embrace the spherical upper end of one of the upstanding studs or bolts 27 on the upwardly offset portion 26a of the inwardly extending bracket portion 26 of the spring seat 21. The split socket member 32 is held within the recess 31 provided therefor in the torque rod 30 by means of a plug 33 that is threaded into the upper end of said recess. The opposite end portion of each torque rod passes through a horizontal opening 34a provided therefor in an upstanding lug or bracket 34 formed integral with the axle housing located therebelow.

Sleeved on the torque rod adjacent to the upstanding bracket 34 on the axle housing is a ball or spherical journal comprising two sleeves 35 disposed one on each side of the web portion of said bracket with their adjacent ends shouldered and fitting within the opening 34a therein; said sleeves being provided with convex spherical surfaces 35a. Sleeved on the torque rod adjacent to each one of the spherical sleeves is a bearing member 36 having a hub portion adapted to fit the torque rod and a hemispherical socket 37 adapted to fit the hemispherical portion of the adjacent sleeve 35 of the split spherical journal sleeve. The socket sleeves 36 are held in engagement with the ball sleeves 35 by means of coil springs 38 sleeved on the torque rod adjacent to the ends of the hub portions of said ball sleeves. The torque rod spring located between the axle housing and the spring seat is located between the hub of one of the socket members and a collar 30a formed integral with said torque rod; and the other spring is located between the hub of the other socket sleeve and a pair of nuts threaded on the end of said torque rod. As shown in the drawings, the torque springs are enclosed within cylindrical casings 39 that are removably secured at one end of the hub portion in the adjacent socket member preferably by means of screws 40.

By the arrangement described, each wheel of the truck is adapted to accommodate itself to rough or uneven roads by reason of the ball-and-socket connections between the axle housings and the side frames and the ball-and-socket connections between the torque rods and the housings and spring seats, which connections permit independent rising or falling of the ends of each axle housing when the wheels strike high or low spots in the road. It is noted that the ends of the cross tube have a snug fit in the cross bores of the truck side frame members and thus serve to resist any tendency for the truck frame to be thrown out of square; that is, it prevents one side frame from moving ahead of the other side frame and thereby prevents swinging movement of the axle housings in a horizontal plane. Said cross tube also permits joint transverse tilting of the frames when one or the other is raised or lowered.

It is also noted that the two axle housings of the truck are linked together above the side frame members by the torque rods which operate to resist the tendency for said axle housings to turn or rotate on their axes, due to the driving, braking or traction strains thereon, by transmitting these torque stresses from the axle housings to the spring seats and thence to the body supporting springs to be absorbed thereby. It is also noted that spring seats are prevented from being rotated in a horizontal plane and thus twisting the body supporting springs by means of the yoke or fork portions of the spring seats which closely embrace the flat sided collars on the cross tube. It is also noted that the universal joint connections between the spring seats and the truck side frames permit crosswise tilting of said frame independently of said spring seats and thus prevent said seats from tilting with the side frames and twisting the springs crosswise.

The hereinbefore described arrangement admits of considerable modification without departing from the invention, and I do not wish to be limited to the precise construction and arrangement of parts shown and described.

What I claim is:

1. In a motor vehicle, a truck comprising two driving axles and side frames connecting said driving axles, members fixed to said side frames intermediate said axles, collars sleeved on said members, spring seats supported on said collars, and connections between said spring seats and said collars permitting transverse rocking movement of said truck side frames relative to said spring seats.

2. In a motor vehicle, a truck comprising two driving axles and side frames connecting said driving axles, cross sleeves fixed to said side frames, a cross member extending from side frame to side frame with its end supported thereon, spring seats mounted on the cross sleeves of the respective truck side frames, universal joint connections between said spring seats and said cross sleeves, and means for preventing swinging movement of said spring seats in a horizontal plane.

3. In a motor vehicle, a truck comprising two driving axles provided with housings and side frames connecting said housings, a cross member connecting said side frames intermediate said housings, spring seats supported on the respective side frames, means universally connecting said spring seats to said truck side frames, and torque bars connecting the axle housings with said spring seats, said spring seats having portions cooperating with said cross member to prevent horizontal swinging movement of said spring seats with respect to said truck side frames.

4. In a motor vehicle, a truck comprising two driving axles and side frames connecting said axles, a cross member extending from side frame to side frame with its end portions journaled therein, and spring seats mounted on the respective side frames, means universally connecting said spring seats to said side frames, said spring seats being provided with yoke-shaped bracket portions adapted to straddle said cross member to prevent horizontal swinging movement of said spring seats on said side frames.

5. In a motor vehicle, a truck comprising two driving axles provided with housings and side frames connecting said housings, a cross member extending from side frame to side frame intermediate said housings with its end portions journaled in said side frames, spring seats mounted on the respective side frames, means universally connecting said spring seats to said side frames, and torque bars extending from the axle housings to said spring seats and having ball-and-socket connections therewith, said spring seats being provided with depending yoke portions adapted to straddle said cross member to prevent horizontal swinging movement of said spring seats on said side frames.

6. In a motor vehicle, a truck comprising two driving axles provided with housings and side frames having ball-and-socket connections with said housings, a cross member connecting said side frames intermediate said housings with its ends journaled in said side frames, spring seats mounted on the respective side frames, and means universally connecting said spring seats to said side frames, torque bars connecting the axle housings with said springs seats, and flat sided collars rigidly secured to said cross member adjacent to the inner faces of said side frames, said spring seats having yoke portions adapted to embrace the flat sides of said collars to prevent horizontal swinging movement of said spring seats.

7. In a motor vehicle, a truck comprising two driving axles provided with housings and side frames having ball-and-socket connections with said housings, a cross member extending from side frame to side frame intermediate said housings, with its ends journaled in said side frames, collars sleeved on said cross tube and nonrotatably fixed to the respective side frames, said collars being provided with convex spherical journal portions, spring seats mounted on said collars and having concave spherical bearings fitting the spherical journals of the respective spring seats, torque bars connecting the axle housings with said spring seats and having universal joint connections therewith, and flat sided collars fixed to said cross member adjacent to said side frames, said spring seats having depending yoke portions adapted to straddle the flat sided collars on the cross member.

8. In a motor vehicle, a truck comprising two driving axles provided with housings and side frames connecting said housings, spring seats supported on the respective side frames, and torque bars connecting the axle housings with said spring seats, and having ball-and-socket connections therewith, the ball-and-socket connections between a torque rod and an axle housing comprising an upstanding web on said axle housing apertured to receive the torque rod, a two part ball member arranged with one part on each side of said web and apertured to receive said torque rod, sleeves slidable on said rod and provided with socket portions adapted to cooperate with the two part ball, and springs sleeved on said rod between an abutment thereon and the ends of the socket sleeves.

9. In a motor vehicle, a truck comprising two driving axles provided with housings and side frames connecting said housings, spring seats supported on the respective side frames, and torque bars connecting the axle housings with said spring seats and having ball-and-socket connections therewith, the ball-and-socket connections between a torque rod and an axle housing comprising an upstanding web on said axle housing apertured to receive the torque rod, a two part ball member arranged with one part on each side of said web and apertured to receive said torque rod, sleeves slidable on said rod and provided with socket portions adapted to cooperate with the two part ball, and springs sleeved on said rod between an abutment thereon and the ends of the socket sleeves, and tubular casings surrounding said spring and secured to said socket sleeves.

10. In a motor vehicle, a truck comprising two driving axles and side frames connecting said axles and provided intermediate their ends with cross bores, cylindrical sleeves mounted in the cross bores of the respective side frames, a cross tube extending from side frame to side frame with its ends journaled in the sleeves therein, annular collars sleeved on the sleeves of said side frames and provided with convex spherical journal portions, and spring seats mounted on said collars and having concaved spherical bearings fitting the spherical journals of said spring seats.

11. In a motor vehicle, a truck comprising two driving axles provided with housings, side frames connecting said housings, brackets supported on said side frames, means universally connecting said brackets to said side frames, connections between said brackets and said axle housings for resisting the tendency for the latter to rotate on their axes, and means for preventing horizontal swinging movement of said brackets on said side frames.

12. In a motor vehicle, a truck comprising two driving axles provided with housings, side members connecting said housings, a cross-member extending from side member to side member intermediate said housings with its end portions journaled in said side members, spring seats having bearings adapted to receive said end portions of said cross-member and portions that are spaced inwardly from said bearings and are adapted to engage portions of said cross-member located intermediate said side members, and torque rods connecting said axle housings with said spring seats intermediate said side members.

13. In a motor vehicle, a truck comprising two driving axles provided with axle housings, members connecting said axle housings, spring seats supported on the respective connecting members, and torque members connecting said axle housings with said spring seats, the connection between a torque member and an axle housing comprising a lug on said housing, a ball on said lug and apertured to receive said torque rod, socket members slidable on said torque rod on opposite sides of said ball members and cooperating therewith, and springs sleeved on said torque rod between abutments thereon and the respective socket members.

14. In a motor vehicle, a truck comprising two driving axles provided with axle housings, members connecting said axle housings, spring seats supported on the respective connecting members intermediate said housings, and torque members connecting said axle housings with said spring seats, the connection between a torque member and an axle housing comprising a lug on said housing, a ball on said lug and apertured to receive said torque rod, socket members slidable on said torque rod on opposite sides of said ball member and cooperating therewith, and springs sleeved on said torque rod between abutments thereon and the respective socket members, one of said abutments being adjustable longitudinally of said rod.

15. In a motor vehicle, a truck comprising two driving axles provided with axle housings, members connecting said axle housings, spring seats supported on the respective connecting members intermediate said housings, and torque members connecting said axle housings with said spring seats, the connection between a torque member and an axle housing comprising a lug on said housing, a ball on said lug and apertured to receive said torque rod, socket members slidable on said torque rod on opposite sides of said ball member and cooperating therewith, springs sleeved on said torque rod between abutments thereon and the respective socket members, one of said abutments being adjustable longitudinally of said rod, and tubular casings surrounding said springs and secured to said socket members.

Signed at Detroit, Michigan, this 19th day of June, 1928.

HERBERT W. ALDEN.